Dec. 19, 1950 A. TISCIONE 2,534,804
ELECTRIC LIGHT SOCKET
Filed Jan. 24, 1947 3 Sheets-Sheet 1
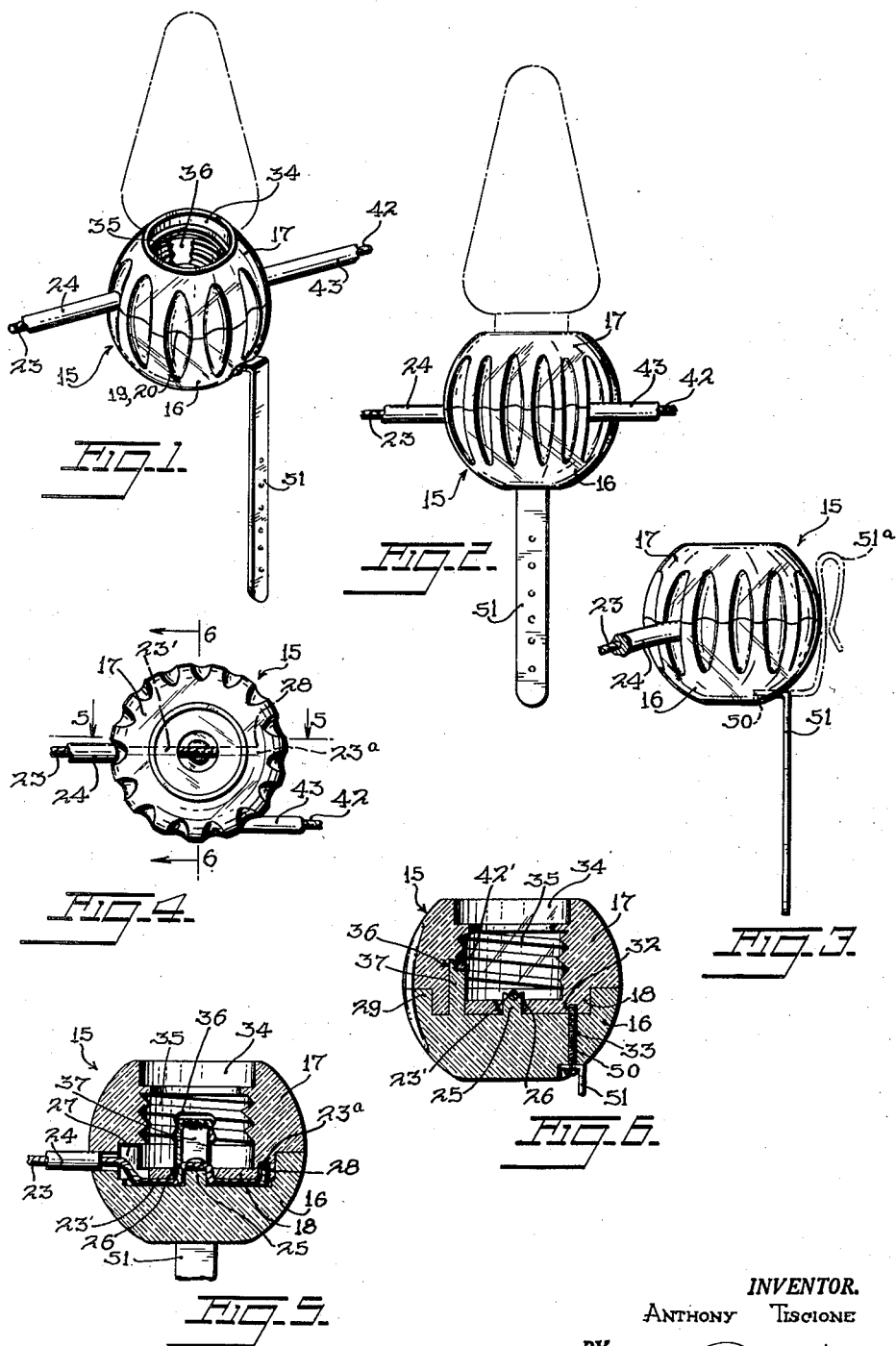
INVENTOR.
ANTHONY TISCIONE
BY
ATTORNEY Dec. 19, 1950     A. TISCIONE     2,534,804
ELECTRIC LIGHT SOCKET
Filed Jan. 24, 1947     3 Sheets-Sheet 2
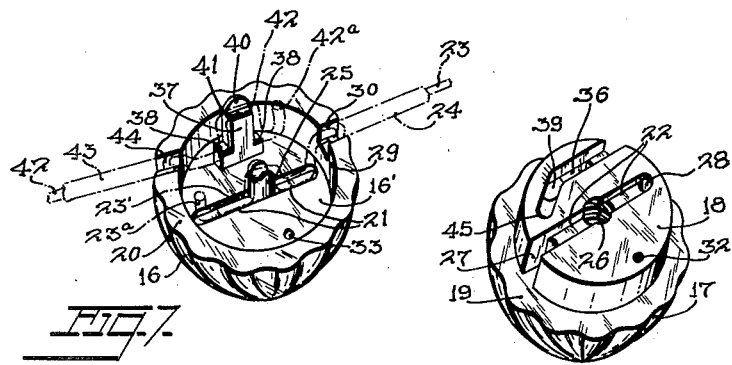
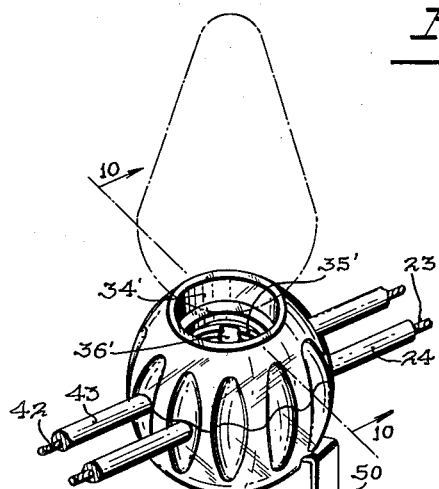
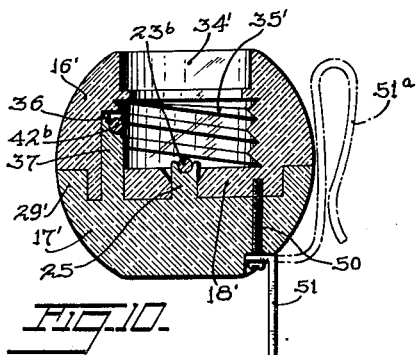
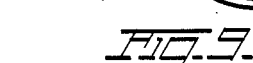
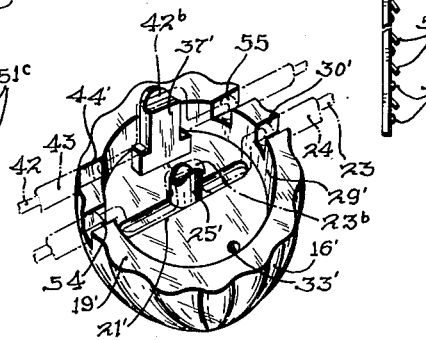
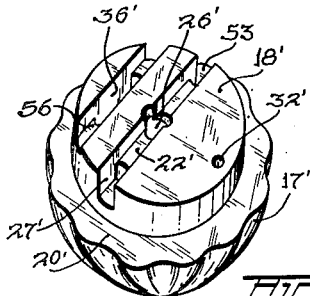
INVENTOR.
ANTHONY TISCIONE
BY
*[signature]*
ATTORNEY Dec. 19, 1950   A. TISCIONE   2,534,804
ELECTRIC LIGHT SOCKET
Filed Jan. 24, 1947   3 Sheets-Sheet 3
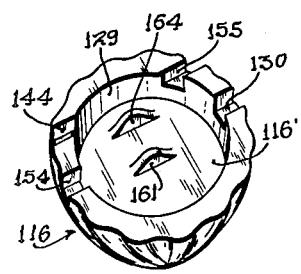
Fig.13.
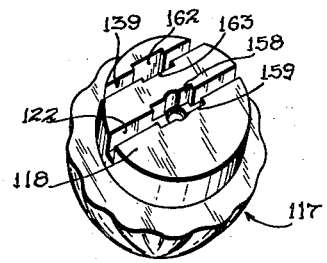
Fig.14.
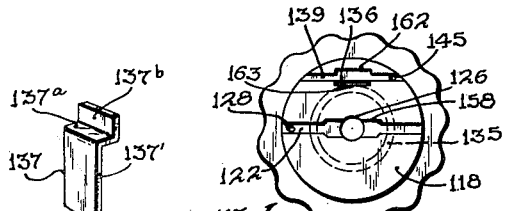
Fig.17.   Fig.15.   Fig.16.
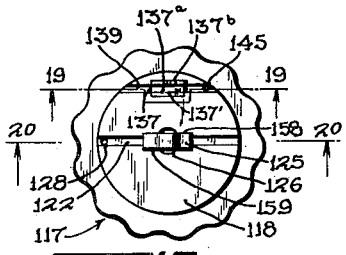
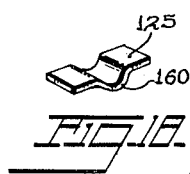
Fig.18.
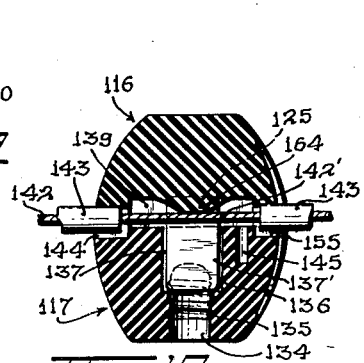
Fig.19.
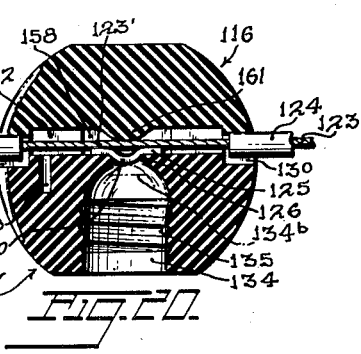
Fig.20.
INVENTOR.
ANTHONY TISCIONE
BY
ATTORNEY Patented Dec. 19, 1950

2,534,804

UNITED STATES PATENT OFFICE 2,534,804

ELECTRIC LIGHT SOCKET

Anthony Tiscione, Brooklyn, N. Y.

Application January 24, 1947, Serial No. 723,909

10 Claims. (Cl. 173—358)

This invention relates to light bulb sockets and, more particularly, to sockets of the general type which broadly was first proposed in my copending application Serial No. 638,804, filed January 3, 1946, now Patent No. 2,466,566, issued April 5, 1949.

The above referred to socket, to improvements in which the present invention is directed, has the advantage that there may be omitted therefrom the usual thread-carrying metal sleeve in the socket-proper, and yet the socket can be quickly and easily attached to wires for forming part of the energizing circuit for a light bulb in the socket.

A main feature, among others, of the form of socket previously proposed by me as aforesaid, is a combination of parts such that terminal screws or other specially to be manipulated connector means for said wires are entirely dispensed with.

As facilitative of taking advantage of this feature, the new socket as illustratively shown in said copending application includes a one-piece body of insulating material equipped with interior arrangements and instrumentalities such that when bared or stripped sections of the wires are inserted in said body, and the base of a light bulb is fully mounted in the socket, one of the two terminals of the bulb is thereby forced to make good tight contact with the bared section of one of said wires and the other bulb terminal is simultaneously forced to make good tight contact with the bared section of the other wire.

An object of the present invention is to provide a socket incorporating a plural part body of electrically insulative material, and one which, while having the above noted advantages, is of a novel and improved type.

Another object of the invention is to provide an improved means for locking in place the bared section of the wire which is to contact one of the bulb terminals, to wit, that bulb terminal which in the present-day bulb is centrally projected as a button or the like from the free end of the bulb base.

Another object of the invention is to provide an improved means for locking in place the bared section of the wire which is to contact the bulb terminal other than the one just mentioned, to wit, the terminal on the present-day bulb which ordinarily is a threaded metal sleeve on the bulb base, when, for example, the bulb is of the so-called screw-base type.

A further object of the invention, in the connection last noted, is to provide a novel and improved passageway through the main body of insulation of the socket for receiving the wire for conductively coacting with the threaded sleeve on the bulb base, or with an equivalent bulb part such as a laterally offset stud well-known as a feature of the so called bayonet-joint bulb-base.

Still another object of the invention is to provide a novel and improved type of recess communicating with the thread-carrying interior of the socket-proper, and one which will require removal of less of the socket material in a direction longitudinally of such thread than previously, yet a recess functioning to insure perfect conductive coaction of a wire with a part of or on the side wall of the bulb-base when the bulb is screwed down into the socket-proper.

A further object of the invention is to provide, in regard to the two passageways for separately accommodating the two wires to be inserted in the body of insulation, an arrangement such that said passageways may each be a groove on a surface of the body, as contradistinguished from a cylindrical bore or analagous laterally continuous passageway through the body.

Still a further object of the invention is to provide a socket capable of incorporating all the advantages above enumerated, and wherein a selected one of various types of electrical connections may be made by way of the two wires aforesaid; even when it is desired to connect a plurality of sockets in multiple or parallel, where this type of connection for a plurality of sockets is desirable, as in the case of a string of Christmas-tree lights.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view showing one form of socket pursuant to this invention when a screw-base type of light bulb is used; the parts being observed from a point of view somewhat above the top of the socket to show a part of the internal thread in the socket-proper and a part of the bulb-base receiver thus threaded—the light bulb being indicated in dot and dash.

Fig. 2 is a side elevational view of the same socket, also showing the light bulb in dot and dash.

Fig. 3 is a view similar to Fig. 2, but with the socket rotated through 90° about a vertical axis.

Fig. 4 is a top plan view of the socket.

Fig. 5 is a vertical section, taken on the line 5—5 of Fig. 4.

Fig. 6 is a similar section, but taken on the line 6—6 of Fig. 4.

Fig. 7 is a top perspective view of one socket part, and showing, in dot and dash, dispositions of wire portions within the socket.

Fig. 8 is a bottom perspective view of the other socket part.

Fig. 9, a view similar to Fig. 1, but on a somewhat enlarged scale, shows a modification.

Fig. 10 is, on a still more enlarged scale, a vertical section taken on the line 10—10 of Fig. 9.

Fig. 11 further illustrates said modification, this being a view similar to Fig. 7.

Fig. 12 is also a further illustration of said modification, this being a view similar to Fig. 8.

Fig. 13 is a top perspective of the receptor of another embodiment.

Fig. 14 is a bottom perspective of the cap thereof.

Fig. 15 is a bottom plan view of said cap.

Fig. 16 is a similar view, with two fitments added.

Fig. 17 shows one of said fitments.

Fig. 18 shows the other thereof.

Fig. 19 is a section through both cap and receptor, assembled but inverted, and with wiring in place, this section taken on line 19—19 of Fig. 16.

Fig. 20 is a similar view, but taken on the line 20—20 of Fig. 16.

Referring first to the structure shown in Figs. 1–8, 15 designates the socket as a whole; the same having a lower part or receptor 16 and an upper part or cap 17.

Receptor 16 has a chamber 16' for receiving a plug 18 on cap 17 which plug is surrounded by a uniplanar ledge 19 to abut a similar ledge 20 on the receptor 16. When the receptor and cap are thus assembled, the meeting line of the two ledges just mentioned lies as shown at 19, 20 in Fig. 1.

Diametrally of the bottom wall of chamber 16' of receptor 16 is a groove 21, this groove for aligning with a groove 22 extending diametrally across the free end of plug 18 of cap 17, when the parts 16 and 17 are arranged in predetermined relative angular adjustment. Thus, the two grooves supplement each other to provide a laterally continuous passageway for a portion of the bared section 23' of a wire 23 in an insulation sheath 24.

The groove 21 midway along its length is interrupted by an upstanding cylindrical post 25 shaped at its top to provide a wire-cradling formation as best seen in Figs. 6 and 7. The matching groove 22 midway along its length is interrupted by a recess 26. Said groove 22 at one end opens into a cubicle 27, and at its opposite end into an open-bottomed vertical cylindrical recess 28 of a diameter slightly greater than that of the wire 23.

The circumferential flange 29 of receptor 16 is traversed by a radially extending groove 30 above but in line with the groove 21, so that when the main parts 16 and 17 are assembled and in predetermined relative angular adjustment the groove 30 will be opposite the cubicle 27.

To assist in coupling the parts 16 and 17 to bring them into assembly in predetermined relative angular adjustment, a recess 32 extends upwardly into cap 17 and an aperture 33 extends vertically through receptor 16. On aligning these elements 32 and 33, the parts 16 and 17 are in the predetermined relative angular adjustment.

When the parts 16 and 17 are coupled in said relative angular adjustment, the bared section 23' of wire 23 is nested in place between the cap and the receptor, as best shown in Fig. 7. Then, with the insulation sheath 24 lying in the groove 30, the wire section 23', at a portion intermediate its ends shaped to a U, has the bottom stretch of such U clamped in the cradling formation at the free end of post 25, while a terminal portion 23$^a$ of the section 23', bent at an angle of 90° is vertically upright and projects into the recess 28 of cap 17.

The socket-proper (Figs. 1, 5 and 6) is constituted by a well-like recess 34 in the upper portion of the cap 17, such recess shaped to incorporate an internal thread 35 matching the standard thread on the base of the ordinary screw-base light bulb. The socket-proper has its threaded side wall interrupted by a recess 36; this recess extending over only a comparatively short distance in the direction of spiralling of the thread 35. The recess 36, at its bottom portion, is also seen in Fig. 8.

Comparing Figs. 5, 6 and 7, it will be noted that the receptor 16 carries a blade-like post 37, upstanding from the floor of the chamber in the top of the receptor. This post 37, of inverted T shape, is for entering the recess 36. When the two main socket parts 16 and 17 are assembled in the relative angular adjustment already explained, the upper surfaces 38 of the cross bar of the T which defines the shape of post 37 side-elevationally thereof lies at about the level of the upper surface of the plug 18 (Fig. 8), and, for a purpose to be explained hereinafter, at a precise distance vertically from the surface which is shown in Fig. 8 as the bottom of a groove 39— which last-mentioned surface, however, becomes the roof of said groove 39 when cap 17 (inverted from its position shown in Fig. 8) is applied to receptor 16.

As will be understood, before coupling the cap 17 and the receptor 16 both wires are provisionally set in place; and in connection with the other wire, next to be mentioned, it will be noted that the top of post 37 (Fig. 7) has a terminal lip 40 thinner than the remainder of the post, to provide a step or shelf 41. The other wire, marked 42, has a section 42' bared or stripped of its insulation sheath 43.

For receiving the end portion of said sheath, receptor 16 is provided at its flange 29 with a secantly extending groove 44 above but in line with one end portion of the groove 39 in the cap 17. Thus, when the parts 16 and 17 are assembled correctly, that is, in predetermined relative angular adjustment, the groove 44 will be in line with that portion of groove 39 into which opens the bottom of cavity 36. The groove 39, at a terminal portion beyond the cavity 36, is obliquely inclined as shown in Fig. 8. At the inner end of the groove 39, the same opens into a cylindrical recess 45, having a function, as is about to be explained, analogous to that of recess 28.

With receptor 16 and cap 17 correctly coupled, a bared section 42' of wire 42 is also nested in place between said parts. Then, with the insulation sheath 43 lying in the groove 44, the wire section 42' at a portion intermediate its ends shaped to a U, has the central stretch of such U clamped onto the step or shelf 41, while terminal portion 42$^a$ of a section 42, bent at an angle of 90°, is vertically upright and projects into the recess 45 of cap 17.

In making the socket parts maximum cost reduction is obtained by molding the cap 17 in all its recesses and projection, and also the receptor 16 similarly, each as a single piece, of a plastic of suitable dielectric quality. In this connection, a feature of the invention in its preferred form, incidentally, is the utilization of elements analogous to the posts 25 and 37 which are not metallic or electrically conductive, but, instead, are of insulating material.

Assembly: Preparatory to coupling the parts 16 and 17, each of the wire sections 23' and 42' is shaped, so far as the U thereof is concerned, approximately or even closely to the bends shown in Fig. 7, and the same as to the terminal lengths 23$^a$ and 42$^a$ of the two wires. This preliminary shaping can be effected on the job by the use of ordinary pliers, or it can be done at the factory, as by employment of a simple and well known wire stripper device and a simplified form of the familiar four-slide wire forming machine.

Said terminal wire portions 23$^a$ and 42$^a$ are inserted respectively into recesses 26 and 45 of cap 17, with the cap arranged as in Fig. 8, and the two wires are provisionally caught in place by thrusting the U-bend of the wire 23 into the recess 26 and the U-bend of the wire 42 into the cavity 36.

If now, with the cap 17 still inverted as in Fig. 8, the receptor 16 is maintained in its position shown in Fig. 7 and coupled onto the inverted cap 17 while being advanced for the coupling with the parts 16 and 17 maintained in the predetermined relative angular adjustment (as can easily be done by maintaining aperture 33 aligned with hole 32), the posts 30 and 37 will respectively enter the recess 26 and the cavity 36; and as the parts 16 and 17 are forced together to insert plug 18 fully into the chamber surrounded by the circumferential flange 29 of cap 17, the U-bend of wire section 23' is squeezed into final shape for close cling at the central section thereof against and within the cradling formation at the free end of post 25, and at the same time a similar result will be effected, at the shelf 41 of post 37, relative to the central length of the U-bend included in section 42' of wire 42.

Finally, all the parts may be conveniently locked in their assembly as just described by applying a screw 50 through the aperture 33 of receptor 16 and into the recess 32 of cap 17, as best shown in Fig. 6. Both the elements 32 and 33 may be tapped, but to avoid unduly complicated molds or subsequent machining after the parts are molded, and indeed to expedite application of the screw 50, it is preferred to tap merely the recess 32.

At 51 is indicated a fitment which may be secured in place by the screw 50 when the latter is applied. This fitment is a strip of readily flexible material, as one of metal so flexible that it may be readily manually given various bendings, such as the hooked formation indicated at 51$^a$ in Fig. 10, for giving the socket any desired placement as, for instance, on a branch or twig of a Christmas tree. Said strip may be provided as shown with teats 51$^b$ and for prongs 51$^c$ (see Fig. 10), for locking the socket in the desired placement.

Referring to the form of the invention shown in Figs. 9-12, the parts given reference characters the same as those used in Figs. 1-8 are corresponding parts. Also, the parts marked 16', 17', 18', 19', 20', 21', 22', 25', 26', 27', 29', 30', 32', 33', 34', 35', 36', 37' and 44' correspond respectively to the parts given these reference characters without primes in Figs. 1-8.

Groove 22', however, is different from groove 22 in that the former opens at its end remote from cubicle 27' into a like cubicle 53. Also, diametrically opposite the groove 30', the groove 29' has a similar groove 54, while secantly in line with groove 44' the flange 29 has a similar groove 55. Further, as another point of differentiation of the modification now being described, the plug 18' of cap 17' has a groove 56 which, provided in lieu of the groove 39 of Fig. 8, extends from end to end secantly across the plug of the receptor. This groove 56, however, intermediate its ends, like the groove 39 relative to the cavity 36, communicates with the cavity 36' for receiving post 37'.

A bared section 23$^b$ of wire 23 is at an intermediate portion bent into a U as shown in Fig. 11, and a bared section 42$^b$ of wire 42 is intermediate its ends bent into a U also as shown in Fig. 11.

It will be noted further, that while the sections of wires 23 and 42 bared for making contact with the two terminals of the light bulb inserted into the socket, are terminal lengths of these wires, the bared sections of the wires 23' and 42' are intermediate lengths of said wires. As will now be understood, that is why the groove 56 of cap 17' runs straight across the latter, and why, also, the flange 29' of receptor 16' is provided with two pairs of aligned grooves 30' and 54, and 44' and 55.

The manner of assembly of the socket of Figs. 9-12 is like that above described for the socket of Figs. 1-8, except that the preliminary shaping of the bared wire sections 23$^b$ and 42$^b$ is merely to form their intermediate portions into the U-bends as in Fig. 11. This having been done, and with the cap 17' upside down as in Fig. 12, said U-bends are sent down into, respectively, the recess 26' and the cavity 36', and then the receptor 16', inverted from its position shown in Fig. 11, is coupled to the receptor 16' while the parts 16' and 17' are in the predetermined relative angular adjustment required to line up the grooves 22' and 56 of the cap 17' with, respectively, the pair of grooves 30' and 54, and the pair of grooves 44' and 55, of the receptor 16'. Thus the four grooves last mentioned house the four end portions of the insulation sheathings which mark the opposite limits of the two bared wire sections 23$^b$ and 42$^b$.

According to the embodiment of Figs. 1-8, it will be noted, a plurality of the sockets may be connected in parallel, and this with each socket joined to two wires special to it, and so to allow placement of any socket without regard to placement of any other socket; whereas the embodiment of Figs. 9-12 is of particular utility and convenience in the case where a plurality of sockets are to be arranged on wiring definite distances from each other, as in a string of Christmas tree lights. Then the advantageous parallel circuit may still be employed, but with merely two wires used for all sockets because both wires pass through each socket and thence go on to the next socket in line.

In either case, when a light bulb is fully inserted into any socket, an energizing circuit for that bulb continues, regardless of whether a bulb is or is not in another socket and whether or not the latter bulb is burned out; the bared sections of the two wires passing through the first named socket being bridged by the metallic parts carried by the base of the light bulb in that socket.

Referring finally to the form of the invention illustrated in Figs. 13–20, the receptor and the cap here are marked generally 116 and 117, respectively. For maximum cost reduction, each of these parts, in all its recesses and projections, is preferably a single-piece molding made from a plastic of suitable dielectric quality.

The parts 116 and 117 have the general characteristics already described; except that, for advantages which will later be made clear, posts such as those shown at 25 and 37 in Fig. 7 and at 25′ and 37′ in Fig. 11 are omitted, while also omitted is a groove such as that shown at 21 in Fig. 7 or at 21′ in Fig. 11. Other features, however, are added, as will below be pointed out.

The elements now to be described, being the same or substantially the same as those in the forms of the invention previously described, will have reference characters applied thereto which are the same as used in Figs. 1–3 but preceded by the digit "1," in accordance with the use of the reference characters 116 and 117 as just above.

The receptor 116 includes a chamber 116′ at its underside for taking a plug 118 on the cap 117 to the full depth of said chamber.

Plug 118 has a diametral groove 122, this groove for taking a bared portion 123′ of a wire 123 in an insulation sheath 124.

For insertion into the groove 122 as shown, there is provided a metal fitment 125.

Groove 122 midway along its length is interrupted by a recess 126; and said groove at one end communicates with an open-bottom vertical cylindrical recess 128 (compare with 28 of Fig. 8) of a diameter slightly greater than that of the wire 123. The circumferential flange 129 of recepter 116 is traversed by a pair of diametrally aligned grooves 139 and 154 (compare with 39′ and 54, of Fig. 11), for housing the portions of the insulation sheath 124 near the ends thereof which mark the limits of bared wire portion 123′.

The socket proper 134 of cap 117 is shown as incorporating an internal thread 135 matching the standard thread on the base of an ordinary screw-base light bulb; the button-like end-terminal 134B of such a light bulb being indicated in Fig. 20 in dot and dash, such terminal being here shown in the position it assumes when the screw-base of the light bulb is fully inserted into the socket-proper. The inner end portion of the socket-proper 134 is conical, and opens into the recess 126.

At its threaded side wall socket-proper 134 is interrupted by a cavity 136, for receiving the blade 137′ of a Z-bent metal strip constituting an insertable fitment 137.

There is also a secantly groove 139 crossing the plug 118; this groove intermediate its ends laterally opens into cavity 136.

The groove 139 accommodates the portions 137ª and 137ᵇ of fitment 137, and the bared portion 142′ of the other wire 142 passes through the groove 139. For housing the portions of the sheath 143 of the wire 142 at the ends thereof which mark the limits of bared wire portion 142′, the flange 129 of receptor 116 is also traversed by a pair of grooves so placed as to be alignable with groove 139 across plug 118 of cap 117 when said cap and receptor 116 are assembled. One of said grooves across flange 129 is marked 144 and the other groove is marked 145.

As a companion element to recess 128 in the cap 117, the groove 139 at one end communicates with an open-bottom cylindrical recess 145 (compare with 45 in Fig. 8). This recess 145 like the recess 128 is of a diameter slightly greater than that of the diameter of wire 123 and of wire 142.

The pair of grooves traversing flange 129 of receptor 116, one of said grooves marked 144 as just stated and the other marked 155 (compare these grooves with the groove 44′ and 55 of Fig. 11), are so placed to be alignable with groove 139 of cap 117 when said cap and receptor 116 are assembled.

The presence in one socket, not only of the elements 128 and 145 (compare 28 and 45 in Figs. 1–8), but also the two pairs of grooves crossing the flange 129 of receptor 116 as best shown in Fig. 13 (compare the corresponding two pairs of grooves in Figs. 9–12), permits the same socket to be used at will for having its wiring connected either in accordance with Fig. 7 or in accordance with Fig. 11.

Elements corresponding to those shown at 32, 33, 50 and 51 of Figs. 1–12 are preferably also here employed as and for the purposes already explained.

Elements peculiar to the embodiment of Figs. 13–20, and additional to those already mentioned, will now be described.

For properly taking the fitment 125, the groove 122 intermediate its ends is laterally enlarged on both sides, at 158 and 159, respectively; these enlargements giving a widened floor to the groove 139 where the fitment 125 is to be inserted. The design of the parts is desirably such that the fitment may along its side edges have tight fit against the side walls of said enlargements, to hold the fitment in place after insertion. Then the convex surface of the central lateral troughing of the fitment 125 which is marked 160 in Fig. 18 is positioned to contact the end terminal 134B of the light bulb's screw-base.

For bearing down over the part of the bared portion 123′ of wire 123 which extends along fitment 125, a curvilinearly extended projection 161 is carried by the floor of chamber 116′ of receptor 116; thereby insuring good tight contact between said wire and the fitment.

For properly taking the fitment 137, the groove 139 intermediate its ends is laterally enlarged on both sides at 162 and 163 respectively. Enlargement 162 is for accommodating the portion 137ᵇ of fitment 137 when, with said fitment's portion 137 extending across the groove 139, the blade portion 137′ of the fitment is entered in cavity 136. Said blade makes dependable contact with the metallic sleeve of the light bulb's screw-base on insertion of the latter into the socket-proper 134.

For bearing down over the part of bared section 142′ of wire 142 which extends over the portion 137ª of fitment 137, a curvilinearly extending projection 164 is carried by the floor of chamber 116′ of receptor 116; thereby insuring good tight contact between said wire and the fitment.

The portion 137ᵇ of fitment 137 has no electrical function; but its inclusion is a mechanical convenience, in that it may be sprung to act clampingly against the side wall of enlargement 162 to hold the fitment 137 in place after insertion. As will be understood, if the fitment 137 is to be used when merely including the blade 137′ and the portion 137ª, the enlargement 162 may be dispensed with.

In either case, the advantage of the embodiment just described is that when a wiring connection such as shown in Fig. 7 is desired to be made, the only wire bending needed is the simple one of offsetting a terminal portion of a bared section of each of the two wires, for insertion of such offset terminal portions in the recesses 128 and 145; and when the wiring connection shown in Fig. 11 is desired to be made, no bending at all of the bared sections of the two wires is required.

While the invention has been described as used in connection with a light bulb, the invention is not thus to be limited, as will be understood, the socket functions as last above mentioned in connection with any inserted electrical device, for example, a so-called plug. In the appended claims, the term "insert" is used as inclusive of such a plug, a light-bulb base (whether of the screw-base or other type; unless otherwise stated in a particular claim), or any electrical device to be, or having a part to be, inserted in an electric socket.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp.

2. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said posts and their respective recesses being proportioned to clinch portions of the bared sections of the conductors between their side walls and the walls of said cap defining said recesses.

3. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said receptor being formed with an upstanding flange defining said chamber and which surrounds said plug, said flange being formed with grooves for the passage of the electric conductors to the exterior of said cap and receptor.

4. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said receptor being formed with an upstanding flange defining said chamber and which surrounds said plug, said flange being formed with grooves for the passage of the electric conductors to the exterior of said cap and receptor, the adjacent faces of said plug and the base wall of said chamber being formed with aligned grooves forming passageways extending between said grooves and said posts and recesses for the passage of said electric conductors.

5. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said receptor being formed with an upstanding flange defining said chamber and which surrounds said plug, said flange being formed with grooves for the passage of the electric conductors to the exterior of said cap and receptor, the adjacent faces of said plug and the base wall of said chamber being formed with aligned grooves forming passageways extending between said grooves and said posts and recesses for the passage of said electric conductors, one of said posts and its respective recess being aligned with one of said passageways and one of said grooves and the other of said posts and its respective recess being aligned with the other of said passageways and the other of said grooves.

6. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said receptor being formed with an upstanding flange defining said chamber and which surrounds said plug, said flange being formed with grooves for the passage of the electric conductors to the exterior of said cap and receptor, the adjacent faces of said plug and the base wall of said chamber being formed with aligned grooves forming passageways extending between said grooves and said posts and recesses for the passage of said electric conductors, one of said posts and its respective recess being aligned with one of said passageways and one of said grooves and the other of said posts and its respective recess being aligned with the other of said passageways and the other of said grooves, the bared sections comprising the bared ends of the electric conductors, and said cap being formed with recesses at the ends of said passageways into which the free ends of the bared ends of the electric conductors are extended.

7. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said cylindrical post having its top end shaped to cradle the bared section of its respective wire and hold it in position thereon.

8. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, and an upstanding lip formed on the top end of said second post to project along the side of the bared section of its respective electric conductor opposite the side which is to make electrical contact with the shell contact to hold that bared section in a fixed position in which it contacts the shell contact.

9. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, and means for securing said cap in a superimposed position on said receptor.

10. An electric socket comprising a cap of dielectric material having a threaded recess extended in from its top face to receive the threaded screw base of an electric lamp and a plug depending from its bottom face, a receptor of dielectric material having a chamber extended in from its top face to receive said plug when said cap is superimposed on said receptor, said cap being formed with a concentric recess extended through said plug and communicating with said threaded recess, a concentric cylindrical post extending vertically from the base wall of the chamber of said receptor to have the bared section of an electric conductor extended across the top end thereof to press the bared section upward through said concentric recess into position at the bottom of said threaded recess when said cap is engaged in position on said receptor to make electrical contact with the end contact of the screw base of the lamp, said threaded recess having its side wall at one side thereof interrupted by a recess which extends downward through said plug offset from said concentric recess, and a second post extending vertically from the base wall of said chamber to have the bared section of a second electric conductor extended across the top end thereof and at a location to enter said latter-mentioned recess and press the bared section of said second conductor upward through said latter-mentioned recess when said cap is engaged in position on said receptor to make electrical contact with the shell contact of the screw base of the lamp, said receptor being formed with an aperture arranged in axial alignment with a threaded recess formed in said cap, and a screw passed through said aperture and threaded into said latter-mentioned threaded recess securing said cap in a superimposed position on said receptor.

ANTHONY TISCIONE.

REFERENCES CITED

The following references are of record in the file of this patent:

UNITED STATES PATENTS

| Number | Name | Date |
| --- | --- | --- |
| 856,755 | Amon | June 11, 1907 |
| 1,696,583 | Sargent | Dec. 25, 1928 |
| 1,966,563 | Russell | July 17, 1934 |
| 2,229,403 | Benander | Jan. 21, 1941 |
| 2,360,444 | Pollock | Oct. 17, 1944 |

FOREIGN PATENTS

| Number | Country | Date |
| --- | --- | --- |
| 318,953 | Germany | Oct. 31, 1918 |